May 9, 1939.　　　　W. A. BLACK　　　　2,157,393

CONSTANT SPEED FILM DRIVE

Filed July 14, 1936　　　　2 Sheets-Sheet 1

INVENTOR.
WILLIAM A. BLACK
BY
　　　ATTORNEY.

May 9, 1939.  W. A. BLACK  2,157,393
CONSTANT SPEED FILM DRIVE
Filed July 14, 1936  2 Sheets-Sheet 2

INVENTOR.
WILLIAM A. BLACK
BY
ATTORNEY.

Patented May 9, 1939

2,157,393

UNITED STATES PATENT OFFICE 2,157,393

CONSTANT SPEED FILM DRIVE

William A. Black, Montclair, N. J., assignor, by mesne assignments, to Radio Corporation of America, New York, N. Y., a corporation of Delaware Application July 14, 1936, Serial No. 90,560

7 Claims. (Cl. 271—2.3)

This invention relates to sound motion picture apparatus and particularly to a constant speed film advancing mechanism including a filter for eliminating extraneous speed variations introduced therein.

It is well known in the motion picture art that one of the essential factors for good recording and reproduction is the constant and uniform travel of the film past a light beam either of constant intensity for reproduction or of varying intensity for recording. Not only must the film be advanced at a constant speed but it also must have a constant spatial disposition at the point of contact of the light beam and the film, commonly known as the translation point.

The present invention therefore contemplates a novel film drive having for its primary object the constant advancement of film past the translation point when advanced by a continuously rotatable sprocket having speed variations therein.

A related object of the invention is to make the sound track portion of the film maintain a constant spatial position during advancement without introducing deleterious speed variations therein.

A specific object of the invention is to simultaneously introduce into a film loop intermediate the translation and driving points a filter having a constant value of resistance to loop motion and a variable value of resistance, the variable value being substantially zero for initial small displacements of the loop and increasing rapidly for larger displacements.

The invention utilizes a continuously rotatable sprocket and a film pulled drum, over one end of which the film hangs to permit passage of a light beam therethrough for sound reproduction, and a filter element positioned in the loop of the film intermediate the sprocket and the drum. The rotation of the drum is stabilized by a flywheel mounted on the same shaft as the drum while the filter has been given a novel filter action based on its construction and design. The particular design of the filter permits a simple element to be employed which will adequately smooth out or eliminate fluctuations in speed of the drive sprocket from affecting the speed of the film over the drum at the translation point. Sprocket tooth ripples are eliminated by the flexure of the film over a roller of the filter element.

Other objects and various features of the invention will be apparent from the following description read in conjunction with the accompanying drawings in which.

Figure 1:
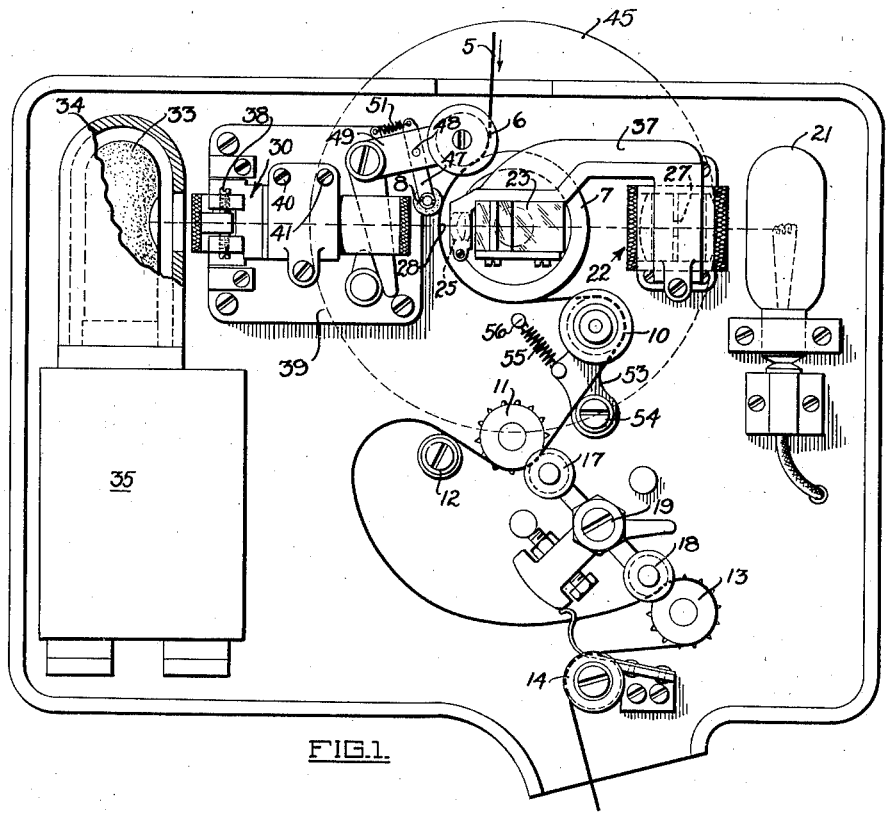
Fig. 1 is an elevational view of a film drive embodying the invention for sound reproduction.

Referring now to the various figures in which the same elements are identified by the same numerals, a film 5 supplied from a reel or projection apparatus (not shown) is passed between an edge guide roller 6 and a drum 7, between a spring pressed roller 8 and the drum 7, over a filter roller 10, under a drive sprocket 11, over a guide roller 12, around hold back sprocket 13 and over a guide roller 14. Two pad rollers 17 and 18, having a common pivot 19, are adapted to operate on sprockets 11 and 13, respectively.

Although the invention is applicable to a sound recorder as well as a sound reproducer, it has been shown herein embodied in a sound reproducer. The optical system of the reproducer includes a constant light source 21, a lens unit 22, a refracting element 23, to bring the light normal to the film (see Fig. 4), and an objective unit 25, this portion of the optical system projecting a rectangular beam of light defined by a slit 27 in unit 22 upon the film at point 28 known as the translation point. The emergent light from the film is picked up by an optical unit 30 having a slit element 31 therein (see Fig. 4) which defines the width of the light beam projected on a photo electric cell 33 enclosed within a shield 34 and mounted on a support 35. The optical units 22, 23 and 25 are supported on a bracket 37 while the lens unit 30 is pivoted at 38 upon the mount 39, the screws 40 and 41 being used to adjust the unit 30 with respect to the emergent light beam.

Figure 4:
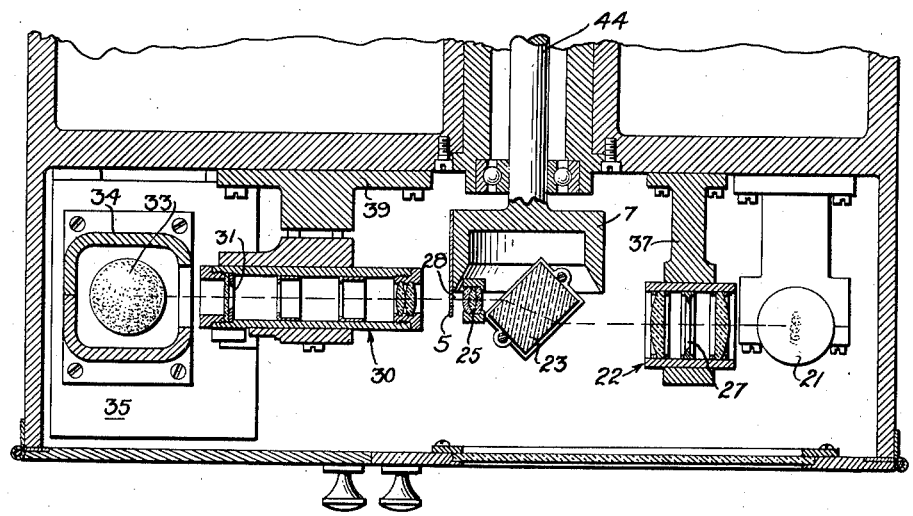
Fig. 4 is a cross sectional plan view of the optical system of Fig. 1 showing the method of passing a light beam through the film.

Referring now to the film drive, the drum 7 is undercut so that the film 5 overhangs at one edge thereof and the light beam may thus pass through the sound track portion of the film (see Fig. 4). The drum is mounted on a shaft 44 which has a flywheel 45 also mounted thereon to stabilize rotation. The flywheel may be mechanically connected to driving mechanism during starting as disclosed and claimed in my copending application Serial No. 38,737, filed August 31, 1935. The film is given a definite spatial position and maintained there during advancement by the rollers 6 and 8, the roller 6 edge guiding the film over the drum 7 and the roller 8 maintaining the film flat on the drum at the translation point. The roller 8 may be rubber covered or have a covering of felt or similar material. It rides in the center of the film at as near the translation point as possible. It also aids in preventing slippage between the drum and film since during running conditions, the drum and flywheel are rotated entirely by film pull. The roller 8 is mounted on an arm 47 pivoted at 48 on the arm 49 which supports the edge guide roller 6 while a spring 51 maintains a predetermined tension of roller 8 against the film.

Figure 2:
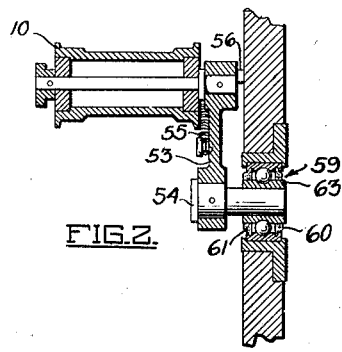
Fig. 2 is a cross sectional view of the filter element of Fig. 1.

In the loop of the film between the drum 7 and the drive sprocket 11 is the filter element which includes roller 10, a mounting bracket 53 pivoted at 54 and having a tension spring 55 connected between the bracket 53 and a point 56 on the mounting plate for the apparatus. It is to be noted in Fig. 2 that the bracket 53 is pivoted to oscillate in a ball bearing 59 which has felt grease retainer rings 60 and 61. The resistance offered by the contact of the felt rings with the bearing portion 63 offers a constant resistance in either direction to displacement of the arm 53 which is made use of in the filtering action of the filter. That is, this contact resistance produces a slight drag on the arm upon which is superimposed the variable resistance produced by the spring 55.

A particular feature of the present invention and of the filter unit is the relationship of the tension in the spring 55 with respect to the tension in the film loop which tends to bodily move the roller 10. This relationship is such that the spring 55 will have a normal position substantially radial with respect to the pivot 54 so that the initial displacement of the roller 10 produces a motion with respect to spring 55 which is substantially at right angles to the spring tension. The departure from an absolute normal relationship will be caused by the pull of the film necessary to overcome friction of the rotating drum and flywheel which has been reduced to a minimum by efficient bearings therefor. The bracket 53 may be a right angle bracket and still this relationship obtains if the spring is connected so that it is radial with respect to the pivot 54. With this particular relationship the spring 55 will exert practically a zero resistance to initial bodily movement of the roller 10 while further displacement will encounter a rapidly increasing resistance. The filter is thus very "soft" for small displacements and increasingly "stiff" for the larger movements. It has been found that this particular type of resistance to variations in speed of the roller 10 provides a filter action which practically eliminates the speed variations in the film at the translation point 28 caused by variations in speed of the drive sprocket 11.

Figure 3:
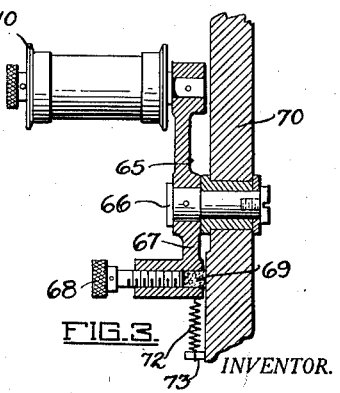
Fig. 3 is a modification of the filter element of Fig. 2.

In Fig. 3 a modification of the filter (Fig. 2) is disclosed which will provide the same filter action. In this design the roller 10 is mounted upon a bracket 65, pivoted at 66 in an ordinary bearing, but which has an extension 67 carrying a screw 68 bearing upon a piece of felt 69, the piece of felt bearing against a side wall 70 over which it slides. The spring 72 is attached to the extension 67 and to a fixed point 73, the normal position of the roller 10 and bracket 65 being such that the spring 72 is substantially radial with respect to the pivot 66. In this embodiment the constant drag or resistance is obtained by the felt 69 on the metal wall 70 or other surface, preferably steel, while in the embodiment of Fig. 2, this resistance is obtained by action of the washers 60 and 61 against the rotatable steel hub 63.

It is to be understood that other designs may be conceived which will provide the same relationship between bodily movement of the roller and spring tension without departing from the principle disclosed above, such designs to be considered within the scope of the appended claims.

I claim:

1. A constant speed film drive comprising a continuously rotatable sprocket subject to variations in speed, a drum adapted to be rotated by film passing thereover, a flywheel for stabilizing the movement of said drum, and means interposed in a film loop between said drum and said sprocket, said means comprising a rotatable roller over which said film passes, a bracket for said roller, a spring exerting tension on said bracket and roller substantially normal to the direction of initial displacement of said roller and rapidly increasing tension to increasing displacement of said roller beyond initial displacement, and a bearing for said bracket providing a substantially constant resistance at all displacements of said roller, said substantially constant resistance being produced by steel and felt contact pressure resistance.

2. A constant speed film drive comprising a continuously rotatable sprocket subject to variations in speed thereof, a drum adapted to be rotated by film passing thereover, a flywheel for stabilizing movement of said drum, means for exerting pressure on said film on said drum, and means interposed in a film loop between said drum and said sprocket, said means comprising a roller adapted to be rotated by said film and moved bodily by variations in tension of said film loop, a pivoted bracket for mounting said roller, a spring whose normal tension is exerted radially from the pivot point of said bracket, a mounting for said bracket, and means on said bracket comprising felt in contact with said mounting for introducing a substantially constant resistance to movement of said bracket and said roller.

3. A constant speed film drive in accordance with claim 2 in which said pressure exerting means comprises a spring pressed roller adapted to press said film on said drum.

4. A system for the uniform advancement of film past a translation point comprising a drum over which said film is pulled, a continuously rotatable sprocket for rotating said drum by film pulled over said drum, means for forming a film loop between said sprocket and said drum, said last-mentioned means comprising a roller positioned within said film loop, a support for said roller, said support being pivoted at a point at a distance from the axis of said roller, and a tension spring positioned between a fixed point and a point on said support, said spring exerting tension in a line between said pivot and said fixed point, said line being substantially at right angles to the movement of said roller caused by variations in size of said film loop.

5. A system for the uniform advancement of film in accordance with claim 4 in which movement of said roller is damped by a resistance constant for all rates of movement of said roller.

6. A constant speed film drive comprising a continuously rotatable sprocket subject to variations in speed, a drum adapted to be rotated by film passing thereover, a flywheel for stabilizing the rotation of said drum, and means interposed in a film loop between said drum and said sprocket, said means comprising a rotatable roller over which said film passes, a bracket for supporting said roller, resilient means adapted to exert tension on said roller substantially normal to the direction of initial displacement of said roller and to rapidly increase said tension for increased displacements of said roller beyond said initial displacement, and supporting means for said bracket for providing a substantially constant resistance to all displacements of said roller.

7. A system for the uniform advancement of film past a translation point comprising a drum over which said film is pulled, a continuously rotatable sprocket for rotating said drum by film pulled over said drum, means for forming a film loop between said sprocket and said drum, said last-mentioned means comprising a roller positioned within said loop, a support for said roller, said support being pivoted at a point at a distance from the axis of said roller, and resilient means adapted to exert tension on said roller substantially normal to the direction of initial displacement of said roller and to rapidly increase said tension for increased displacements of said roller beyond said initial displacement.

WILLIAM A. BLACK.